US012750665B2

(12) United States Patent
Jagannath

(10) Patent No.: US 12,750,665 B2
(45) Date of Patent: Sep. 29, 2026

(54) VALIDATION OF ACCESS RIGHTS CORRESPONDING TO A RESTRICTED SETUP

(71) Applicant: ZED DIGITAL, Columbus, OH (US)

(72) Inventor: Sumithra Jagannath, Columbus, OH (US)

(73) Assignee: ZED DIGITAL, Columbus, OH (US)

( * ) Notice: Subject to any disclaimer, the term of this patent is extended or adjusted under 35 U.S.C. 154(b) by 57 days.

(21) Appl. No.: 18/664,557

(22) Filed: May 15, 2024

(65) Prior Publication Data

US 2024/0388903 A1 Nov. 21, 2024

(30) Foreign Application Priority Data

May 15, 2023 (IN) ............................ 202311034128

(51) Int. Cl.
*H04W 12/06* (2021.01)
*H04W 12/08* (2021.01)

(52) U.S. Cl.
CPC .......... *H04W 12/06* (2013.01); *H04W 12/08* (2013.01)

(58) Field of Classification Search
CPC ...... H04W 12/06; H04W 12/08; H04W 12/64
See application file for complete search history.

(56) References Cited

U.S. PATENT DOCUMENTS

2015/0200925 A1* 7/2015 Lagerstedt ........ H04W 12/0431 726/6
2016/0379428 A1* 12/2016 Ahearn ................ H04W 12/64 340/5.61
2018/0146374 A1* 5/2018 Golan .................. G06Q 20/127
2021/0117568 A1* 4/2021 Liu ....................... H04W 12/02
2021/0377738 A1* 12/2021 Lüscher ............ G07C 9/00857
2022/0150710 A1* 5/2022 Jagannath ............ H04W 12/06

* cited by examiner

*Primary Examiner* — Khoi V Le
(74) *Attorney, Agent, or Firm* — HSML P.C.

(57) ABSTRACT

Techniques for facilitating validation of access rights corresponding to a restricted setup are described. According to the techniques, a user device detects presence of a control device within a predetermined range of the user device wirelessly. On detecting the control device to be within the predetermined range, the user device transmits credential data to a remote server wirelessly. The credential data is indicative of access rights corresponding to the restricted setup. The user device receives a notification indicating validity of the credential data from the remote server wirelessly. Valid credential is to be used by a user of the user device to access the restricted setup.

17 Claims, 5 Drawing Sheets

VALIDATION OF ACCESS RIGHTS CORRESPONDING TO A RESTRICTED SETUP

BACKGROUND

With advancement in technology, digitization has become a norm these days. Various services are being digitized for ease and convenience of users. For instance, counter and telephone-based bookings for multiple services, such as transport services, hospitals, theatres, restaurants, hotels, and malls have been replaced by digital bookings that may be made using a user device. To avail the services, the user device may be used to book tickets for transport services, to make appointments to visit places, such as hospital, entertainment and sports centres, restaurant, and hotels, and to avail other similar services. The user device may provide multiple interfaces to avail multiple services offered at different places. For instance, an application may provide an interface to buy tickets for commuting between locations and another application may provide another interface to book a ticket to a sports game.

BRIEF DESCRIPTION OF DRAWINGS

The following detailed description references the drawings, wherein.

In the figures, the left-most digit(s) of a reference number identifies the figure in which the reference number first appears. The same numbers are used throughout the drawings to reference like features and components.

DETAILED DESCRIPTION

Figure 1:
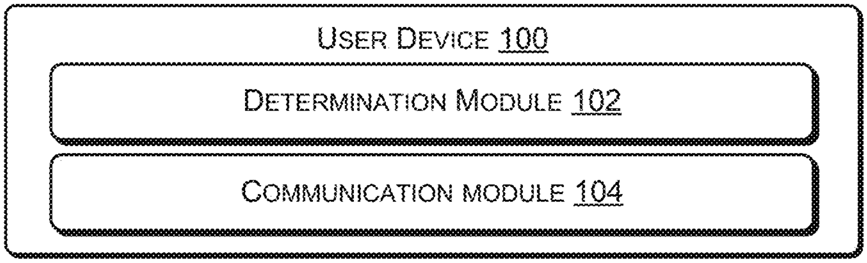
FIG. 1 illustrates a user device for facilitating validation of access rights corresponding to a restricted setup, in accordance with an example of the present subject matter.

Digitization of services has revolutionized the way service industry works, making service providers to move away from traditional methods and platforms of rendering services to new digitized platform. A plurality of digital platforms and applications have been developed to provide multiple services to the users. For instance, an application may be used to book tickets for commuting from one location to another location, while another application may be used to book appointments at various places of interest, such as hotels, sports venues, entertainment venues, and theatres.

Once a user has booked an appointment/purchased ticket for a place of interest, credential data corresponding to the ticket may be generated. When the user reaches the place of interest, the credential data may be validated to provide access at the place of interest. The credential data may be validated in numerous ways.

In one instance, the credential data may be validated manually by the user by tapping a user device against an access control device present at the place of interest. However, such a method of validation is not efficient for handling large crowds. For instance, if such a method of validation were to be employed for validation at a sports arena, a significant amount of time would be spent in validating credential data associated with thousands of users entering the sports arena.

In another instance, the credential data may be validated automatically when the user comes within a proximity of the access control device. In operation, when the user comes within the proximity of the access control device, a user device associated with the user may transmit the credential data to the access control device. The credential data may then be validated against credential data stored at the access control device. Based on the validation, the user may be allowed to avail services provided at the place of interest.

The aforementioned method of automatic validation entails the user device establishing a connection with the access control device for transmission of the credential data. There are situations where the connection between the user device and the access control device may be persistent, such that, the connection may not be released after the transmission of the credential data from the user device to the access control device. In such a situation, the user device may be left permanently connected to the access control device, thereby blocking other user devices from connecting to the access control device for validation of their respective credential data. This may pose delays and/or interruption of automatic validation for other user devices, which may be undesirable, particularly in cases where a large number of user devices need to be rapidly validated to provide access at the place of interest, such as the above-mentioned sports arena.

The aforementioned problem can be alleviated by resetting the access control device at regular intervals. However, if a user device tries to connect during the resetting of the access control device, a connection between the user device and the access control device may not be established, thereby leading to failure of validation of credential data corresponding to the user device.

Further, to validate the user device within a short range, e.g., of 2-3 feet, wireless connection, such as a Bluetooth connection may be established between the user device and the access control device and, an RSSI (received signal strength indicator) value on the Bluetooth module of the access control device may be set to a weak value. This may cause some user devices not being able to connect adequately with the access control device and result in packet loss. Also, if the user device is validated in long range (e.g. 4+ feet) the failure rate, i.e., packet loss may be heavy due to weak signal strength.

According to examples of the present subject matter, techniques for facilitating validation of access rights corresponding to a restricted setup are described.

In an example implementation, techniques that facilitate validation of the access rights corresponding to the restricted setup without establishing a connection between a user device and a control device are described. In operation, it may be determined wirelessly if the control device is present within a predetermined range of the user device. Based on the determination that the control device is present within the predetermined range of the user device, credential data indicative of access rights corresponding to the restricted setup may be transmitted to a remote server wirelessly. In an example, the remote server may then validate the credential data received from the user device. Subsequently, the user device may receive a notification indicating validity of the credential data from the remote server wirelessly. The valid credential may be used by a user of the user device to access the restricted setup.

Sending the credential data to the remote server for validation on determining the control device to be within the predetermined range of the user device ensures validation of the credential data without establishment of a connection between the user device and the control device. Accordingly, the efficiency involved in validation of credential data at the restricted setup is improved.

In another example implementation, techniques that facilitate validation of the access rights corresponding to the restricted setup without establishing a persistent connection between the user device and the control device are described. In operation, the control device may receive the credential data from a user device present within a geofenced area associated with the control device wirelessly, wherein the credential data is indicative of the access rights corresponding to the restricted setup. In an example, the control device may receive the credential data based on Bluetooth Low Energy (BLE) protocol. The control device may then transmit the credential data to a remote server wirelessly for validation. In an example, the remote server may then validate the credential data received from the control device. Subsequently, the control device may receive a notification indicating validity of the credential data from the remote server wirelessly. Based on the notification, the control device may manage access to the restricted setup.

Receiving the credential data at the control device for validation based on the BLE protocol ensures validation of the credential data without establishment of a persistent connection between the user device and the control device. Accordingly, the efficiency involved in validation of credential data at the restricted setup is improved.

The above techniques are further described with reference to FIGS. 1 to 5. It would be noted that the description and the Figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a user device 100 for facilitating validation of access rights corresponding to a restricted setup, in accordance with an example of the present subject matter. Examples of the user device 100 include, but are not limited to, smartphones, tablets, smartwatches, Bluetooth based smart cards, and personal digital assistants. The user device 100 may be utilized for acquiring access rights corresponding to the place of interest/restricted setup. The user device 100 may facilitate acquiring of access rights in numerous ways. In an example, the user device 100 may include an application for facilitating acquiring of the access rights corresponding to the restricted setup. In another example, the user device 100 may allow acquiring the access rights corresponding to the restricted setup over an Interactive Voice Response (IVR) call. The access rights corresponding to the restricted setup acquired by the user device 100 may be stored thereon. When the user device 100 is a Bluetooth based smart card, the access rights corresponding to the restricted setup may be acquired by another device coupled to the Bluetooth smart card and stored thereon. The Bluetooth based smart card may then be utilized for facilitating validation of access rights corresponding to a restricted setup.

In an example implementation, the user device 100 may include a processor (not shown in Figure). In an example, the processor may be implemented as microprocessors, microcomputers, microcontrollers, digital signal processors, central processing units, state machines, logic circuitries, and/or any devices that manipulate signals based on operational instructions. The user device may further include a determination module 102 coupled to the processor for detecting presence of a control device (not shown) within a predetermined range of the user device 100, wirelessly. In an example, the control device may be present at the restricted setup. The determination module 102 may begin searching for the presence of the control device within the predetermined range when a predetermined condition is met.

For instance, in an example, the user device 100 may begin searching for the presence of the control device within the predetermined range on entering a geo-fenced area associated with the control device. The information indicating the geo-fenced area associated with the control device may be acquired by the user device 100 while acquiring the access rights corresponding to the restricted setup. In another example, the user device 100 may begin searching for the presence of the control device within the predetermined range on detecting a user input.

The user device 100 may further include a communication module 104 coupled to processor and the determination module 102. Once the determination module 102 detects the control device to be within the predetermined range of the user device 100, the communication module 104 may transmit credential data to a remote server (not shown) wirelessly, where the credential data is indicative of access rights corresponding to the restricted setup.

In an example, the remote server may validate the credential data received from the user device 100. The communication module 104 may subsequently receive a notification indicating the validity of the credential data from the remote server wirelessly. Valid credential may be used by a user of the user device to access the restricted setup. The manner in which the user device 100 facilitates the validation of credential data corresponding to the restricted setup is described in further details with reference to FIG. 3.

Figure 2:
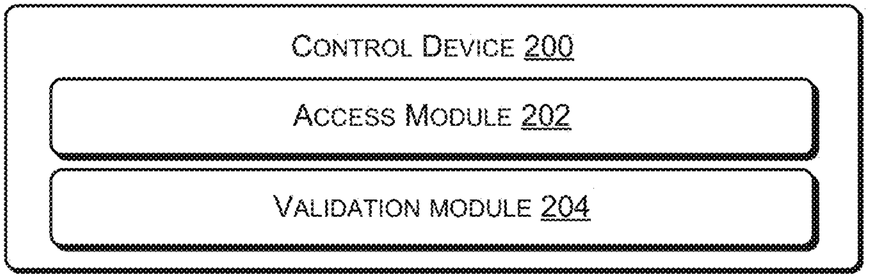
FIG. 2 illustrates a control device for facilitating validation of access rights corresponding to the restricted setup, in accordance with an example of the present subject matter.

FIG. 2 illustrates a control device 200 for facilitating validation of access rights corresponding to a restricted setup, in accordance with an example of the present subject matter. In an example, the control device 200 may be present at the restricted setup. The control device may be a fixed or portable computing device, such as desktop computers, laptops, personal digital assistants (PDAs), tablets or RFID (radio frequency identification) reader that may support wireless communication technologies.

In an example implementation, the control device 200 may include a processor (not shown in Figure). In an example, the processor may be implemented as microprocessors, microcomputers, microcontrollers, digital signal processors, central processing units, state machines, logic circuitries, and/or any devices that manipulate signals based on operational instructions. The control device may further comprise an access module 202 coupled to the processor. In an example, the access module may receive credential data wirelessly from a user device present within a predetermined range of the control device, where the credential data may be indicative of access rights corresponding to the restricted setup. In an example, the access module 202 may receive the credential data from the user device based on the BLE protocol.

In an example, the predetermined range of the control device 200 may be determined based on a geo-fenced area associated with the control device 200. The geo-fenced area associated with the control device 200 may be configured based on multiple factors, such as size and area of the restricted setup, size of an entry point of the restricted setup, and size of an exit point of the restricted setup. For instance, when the restricted setup is a restricted premises, such as an office, hospital, mall, and theatre, the geo-fenced area may be an area within a 20 feet radius around the control device 200. On the other hand, when the restricted setup is a vehicle, the geo-fenced area may be an area within a 3 feet radius around the control device 200.

The user device may be provided with the information indicating the geo-fenced area associated with the control device 200 when the user device acquires access rights corresponding to the restricted setup. Accordingly, in an example, the user device (not shown) may begin transmitting the credential data on entering the geo-fenced area associated with the control device 200.

The control device 200 may further include a validation module 204 coupled to the processor and the access module 202. Once the access module 202 has received the credential data, the validation module 204 may transmit the credential data wirelessly to a remote server (not shown) for validation.

In an example, the remote server may validate the credential data received from the control device 200. The validation module 204 may subsequently receive a notification indicating the validity of the credential data from the remote server wirelessly. Based on the notification, the validation module 204 may manage access to the restricted setup. For instance, if the ticket is found valid in the notification, the validation module 204 may allow the user device to access the restricted setup. While, in case of an invalid ticket, the validation module 204 may deny access to the restricted setup by the user device. The manner in which the control device 200 facilitates the validation of credential data corresponding to the restricted setup is described in further details with respect to the FIG. 3.

Figure 3:
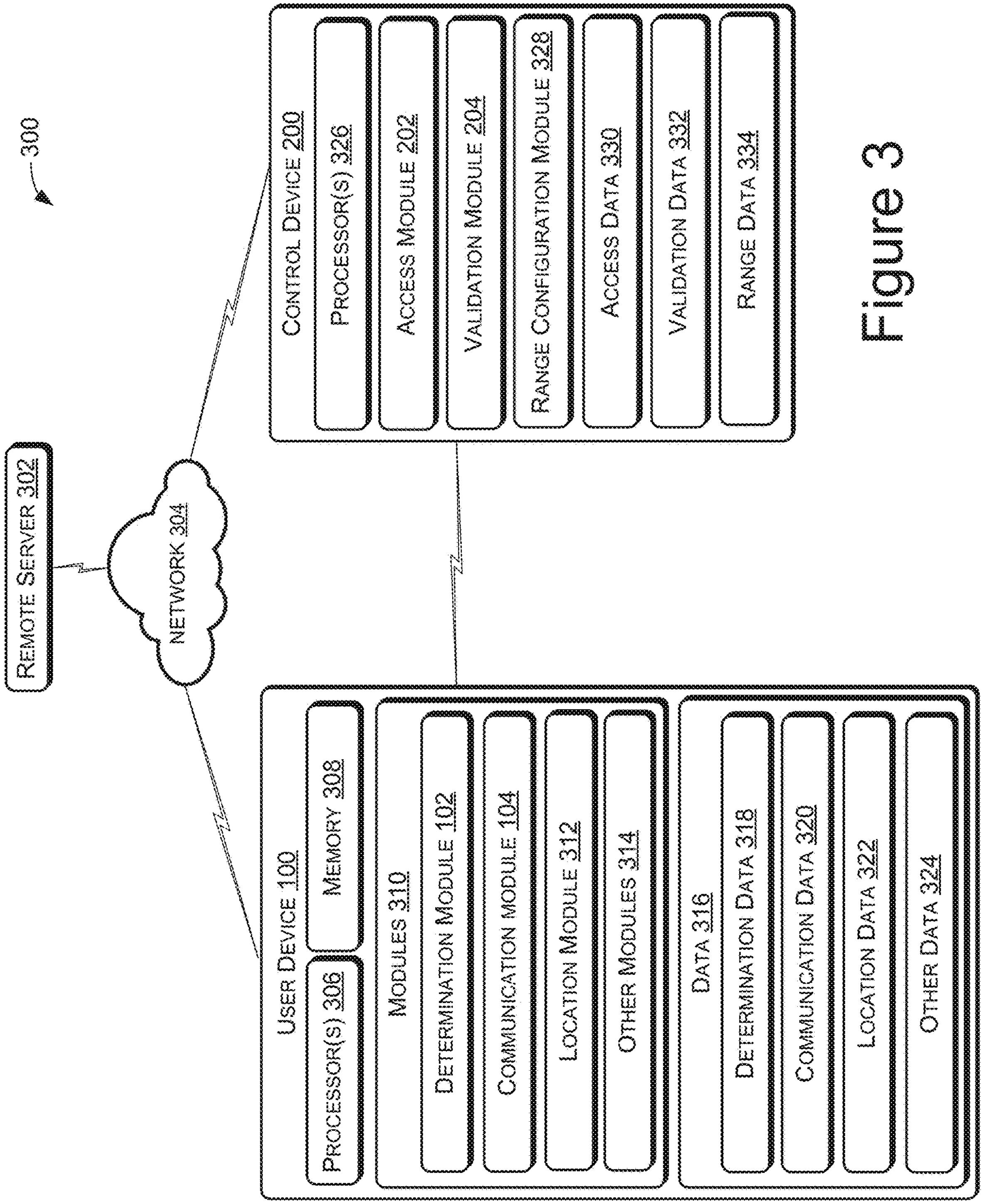
FIG. 3 illustrates a computing environment for facilitating validation of access rights corresponding to the restricted setup, in accordance with an example of the present subject matter.

FIG. 3 illustrates a computing environment 300 for validation of access rights corresponding to a restricted setup, in accordance with an example of the present subject matter. Examples of restricted setups may include, but are not limited to transport services including public transit services, such as bus, train, and trams, and private transport means, such as cabs, bike share, ride share, and car rentals services; and places of interest like health facilities, such as hospitals and clinics; commercial establishments, such as malls, offices, retail stores, banks and financial institutions, supermarkets, research facilities/laboratories; and places of entertainment and recreation, such as amusement parks, sports venues, restaurants, theatres, bars, clubs.

The environment 300 includes the user device 100, the control device 200, and the remote server 302. The user device 100, the control device 200, and the remote server 302, may be communicatively coupled to each other either through a direct communication link, or through multiple communication links of a communication network (not shown). The network 304 may be a wireless or a wired network, or a combination thereof. The communication network can be a collection of individual networks, interconnected with each other and functioning as a single large network. Examples of such individual networks include, but are not limited to, Global System for Mobile communication (GSM) network, Universal Mobile Telecommunications System (UMTS) network, Long Term Evolution (LTE) network, personal communications service (PCS) network, Time-division multiple access (TDMA) network, Code-Division Multiple Access (CDMA) network, next-generation network (NGN), public switched telephone network (PSTN), and Integrated Services Digital Network (ISDN). Depending on the terminology, the network 304 includes various network entities, such as gateways and routers; however, such details have been omitted to maintain the brevity of the description. In an example, the user device 100 may be operable to be connected to one or more control device 200 via a wireless communication link. The wireless communication link may employ multiple wireless technologies that may include but are not limited to Wi-fi, Bluetooth, Near Field Communication (NFC), and Radio frequency identification (RFID).

The user device 100 may include a processor 306 and a memory 308 coupled to the processor 306. The functions of the various elements shown in the Figures, including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, conventional and/or custom, may also be included.

The user device 100 may further include modules 310. The module(s) 310 may include routines, programs, objects, components, data structures, and the like, which perform particular tasks or implement particular abstract data types. The module(s) 310 further includes modules that supplement applications on the user device 100, for example, modules of an operating system. The modules 310 may include the determination module 102, the communication module 104, a location module 312, and other modules 314. In an example, the determination module 102, the communication module 104, the location module 312, and the other modules 314 may be implemented as separate hardware capable of performing different functionalities of the user device 100. The modules 310 may further include electronic circuitry or a combination of electronic circuitry and control programs that operate the components according to the functions described herein. In an example, the other modules 314 may perform functionalities that supplement other functions of the user device 100. The other module(s) 314 may include programs or coded instructions that supplement applications and functions, for example, programs in the operating system of the user device 100.

The memory 308 may include any computer-readable medium known in the art including, for example, volatile memory (e.g., RAM), and/or non-volatile memory (e.g., EPROM, flash memory, etc.). The memory 308 may also be an external memory unit, such as a flash drive, a compact disk drive, an external hard disk drive, or the like.

The user device 100 may further include data 316. The data 316 serves, among other things, as a repository for storing data that may be fetched, processed, received, or generated by the determination module 102, the communication module 104, the location module 312, and the other modules 314. In an example, the data 316 may include determination data 318, communication data 320, location data 322, and other data 324. In an example, the data 316 may be stored in the memory 308.

In an example, the control device may be a fixed or portable computing device, such as desktop computers, laptops, personal digital assistants (PDAs), tablets or RFID reader that may support wireless communication technologies. In an example, the control device 200 may be located at the restricted setup.

The control device may comprise a processor 326. As described with reference to FIG. 2, the control device 200 may include an access module 202 and a validation module 204 coupled to the processor 326. The validation module 204 may be coupled to the access module 202. The control device 200 may also comprise a range configuration module 328. The access module 202, the validation module 204 and the range configuration module 328 may be implemented as separate hardware capable of performing different functionalities of the control device 200. The access module 202 and the validation module 204 may include routines, programs, objects, components, data structures, and the like, which perform particular tasks or implement particular abstract data types. The access module 202 and the validation module 204 may further include electronic circuitry or a combination of electronic circuitry and control programs that operate the components according to the functions described herein. In an example, the access module 202 and validation module 204 may further perform functionalities that supplement other functions of the control device 200. The control device 200 may also comprise a memory (not shown in the Figure) coupled to the processor 326 of the control device 200.

The control device 200 may further include access data 330, validation data 332 and a range data 334. In an example, the access data 330, the validation data 332 and the range data 334 may be stored in the memory of the control device 200. The access data 330, the validation data 332 and the range data 334 may include data generated and used by the access module 202, the validation module 204 and the range configuration module 328, respectively.

In an example implementation, the determination module 102 of the user device 100 may determine presence of the control device 200 within a predetermined range of the user device 100. In an example, the predetermined range of the user device 100 may be determined by the determination module 102 based on at least one of size of the restricted setup, area of the restricted setup, size of an entry point of the restricted setup, and size of an exit point of the restricted setup. The determination module 102 may determine the presence of the control device 200 within the predetermined range based on various communication protocols, such as Wi-fi, Bluetooth, BLE, Near Field Communication, and Radio frequency identification. In an example, the predetermined range of the user device 100 may be dependent on the communication protocol used for determining presence of the control device 200 or used to communicate with the control device 200. For example, Bluetooth signals are weaker than Wi-fi. Further, the determination module 102 may begin searching for the presence of the control device 200 within the predetermined range when a predetermined condition is met.

In an illustrative example, the user device 100 may begin searching for the presence of the control device 200 within the predetermined range on entering a geo-fenced area associated with the control device 200. In an example, the geofenced area may be based on a geolocation of the restricted setup. For instance, when control device 200 is present at a stationary restricted setup, such as an amusement park, the control device 200 may have a geo-fenced area having a radius of around 20 feet at the geolocation of the restricted setup. In an example, the range configuration module 328 may determine the geofenced area of the control device 200 based on at least one of size of the restricted setup, area of the restricted setup, size of entry point of the restricted setup and size of exit point of the restricted setup. In an example, if the restricted setup is a kiosk, the geofenced area may depend on the area covered by the kiosk. While in case of a football stadium, the geofenced area associated with a control device installed at an entry point of the stadium may depend on a size, e.g., 3 feet from the entry point. Information relating to geofenced area may be stored in range data 334. In an example, the predetermined range of the user device 100 may be equal to or greater than the geofenced area of the control device 200. The information indicating the geo-fenced area associated with the control device 200 may be acquired by the user device 100 while acquiring the access rights corresponding to the restricted setup. In an example, the information indicating the geo-fenced area associated with the control device 200 may be stored in the location data 322 and the access rights may be stored in the other data 324.

In the illustrative example, the location module 312 may monitor a geographical location of the user device 100. When the location module 312 determines that the user device 100 has entered the geo-fenced area associated with the control device 200 present at the amusement park, the location module 312 may notify the determination module 102 to begin searching for the presence of the control device 200 within the predetermined range.

In an example, information regarding the geolocation of the restricted setup may be made available to the user device 100 at the time a user of the user device 100 makes a registration, purchases a ticket or books an appointment to access the restricted setup, a service therein or a facility thereof. The information regarding the geolocation may also be made available as part of the information associated with the ticket. In another example, if the restricted setup is publicly known, the information regarding the geolocation of the restricted setup may be available with the user device 100. Once the location module 312 determines that the user device 100 has reached the geolocation of the restricted setup, the location module 312 may notify the determination module 102 to begin searching for the presence of the control device 200 within the predetermined range.

In another illustrative example, the user device 100 may begin searching for the presence of the control device 200 within the predetermined range on detecting a user input. For instance, when the control device 200 is present on a non-stationary restricted setup, such as a vehicle, the location of the control device 200 may keep changing based on a movement of the vehicle. In such a situation, the user device 100 may not begin searching for the presence of the control device 200 within the predetermined range until reception of the user input. For instance, there may be a situation when a user may be waiting at a terminal to board the vehicle. In such a situation, when the user determines that a vehicle destined to user's destination is about to arrive at the terminal, the user may provide the user input to the user device 100 to begin searching for the control device 200 within the predetermined range.

In an example implementation, to enable the user device 100 to determine presence of the control device 200 within the predetermined range of the user device 100, the control device 200 may comprise a beacon transmitter and may transmit beacon continuously or at regular interval to advertise its presence. The user device 100 may scan for the beacons within its predetermined range, once the predetermined condition for searching the presence of the control device 200 is met. The interval at which control device 200 transmits beacons to advertise its presence, affects how often nearby user devices 100 can detect the control device 200. In an example, the beacon transmitter is based on iBeacon technology. Use of iBeacon technology may provide relatively accurate proximity detection, allowing to determine the user's location from the beacon with reasonable precision.

On determining the presence of the control device 200 within the predetermined range of the user device 100, the communication module 104 may transmit credential data to the remote server 302. The credential data may be indicative of access rights corresponding to the restricted setup. In an example, the credential data may be generated when a user of the user device 100 makes a registration, purchases a ticket or books an appointment to access the restricted setup, a service therein or a facility thereof using an interface that may be provided by a corresponding access system. The credential data may include at least one of ticket and user identification information for entering the restricted setup. In an example, the user identification information may include, but is not limited to, biometric data, name, age, gender, and other identification credentials of the user.

In an example, when the restricted setup is a premise of an organization, a user, on becoming an employee of the organization, may be registered with the organization using an access system. On registration, credential data for the employee may be generated and stored on the user device 100 such as an access card. In another example, when the user of the user device 100 purchases a ticket for a sport scheduled to be held at a sport arena, the ticket may include information relating to the fare paid for the event. In such a case, the credential data may include the ticket along with user identification information. In an example, the credential data may be stored in the memory of the user device and a corresponding verification data may be stored at the remote server 302. In another example, the credential data may also be made available to the control device 200. In an example, the user identification information may also be assessed to determine whether the user fulfils other eligibility criteria for accessing the restricted setup at the time of validation. For instance, when an event is adult only, a user who might be having a valid ticket but is not a major may not be allowed entry to the restricted setup corresponding to the event. In an example, the credential data may be stored in the other data 324.

In an example, the communication module 104 may transmit the credential data to the remote server 302 via a stable network connection, if the user device 100 has a stable network connection. In an example, the stable network may be a single network or a combination of multiple networks such as Internet based network or telecommunication-based communication network and may use a variety of different communication protocols. The stable network may be a wireless or a wired network, or a combination thereof. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN). Depending on the technology, the network includes various network entities, such as, gateways, routers; however, such details have been omitted for sake of brevity of the present description. A stable network connection is generally available in restricted setups present in urban areas, e.g., sports arenas. In another example, the communication module 104 may transmit the credential data to remote server 302 via the control device 200. For example, in situations where the user device 100 is unable to communicate with the remote server 302 via a stable network connection because of poor wireless connectivity, a wired connection between the control device 200 and the remote server 302 may be availed.

To transmit the credential data to the remote server 302 via the control device 200, the user device 100 may transmit one or more beacons comprising the credential data, based on detection of presence of the control device 200 within the predetermined range of the user device 100. In an example, the user device 100 may comprise a beacon transmitter for the transmission of beacons. The transmission of beacons may use a BLE connection.

In an example, the access module 202 of the control device 200 present at the restricted setup may continuously or intermittently scan for beacons within its geofenced area. Once the access module 202 of the control device 200 receives the beacons transmitted by the user device 100, the access module 202 may receive the beacons and extract the credential data from the beacons. The credential may be stored in the access data 330 of the control device 200. The validation module 204 may access the credential data from the access data 330 and transmit the credential data to the remote server 302 for validation wirelessly, for example, using a stable network connection.

In another example, on detection of the control device 200, the communication module 104 may transmit the credential data using an IoT based communication protocol including, but not limited to, Message Queuing telemetry transport (MQTT) protocol, Advanced Message Queuing Protocol (AMQP), and Data Distribution Service (DDS) protocol, Extensible Messaging and presence protocol (XMPP). The above-mentioned communication protocols may allow exchange of telemetry messages even in resource-constrained networks. Accordingly, transmission of the credential data using MQTT protocol may ensure delivery of the credential data to the control device 200 even when a network connection on the user device 100 is not stable.

In an example, the user device 100 is an access card, such as Bluetooth based smart card or Near Field Communication (NFC) based access card. In an example, the access card may comprise a processor and a memory coupled to the processor to store information such as credential data. The processor of the access card may add, delete or manipulate the information on the access card. The access may also comprise wireless communication capabilities to communicate with an external device such as the control device to exchange information. In an example, the access module 202 may include a card reader that may allow to manage access to the restricted setup based on the access card. The memory of the access card may also contain computer readable instructions executable by the processor 326 of the control device 200.

In operation, the access rights corresponding to the restricted setup may be stored in a Bluetooth smart card. The Bluetooth based smart card may then be utilized for facilitating validation of access rights corresponding to a restricted setup. In an example, the smart card may be capable of transmitting one or more beacon on entering the geofenced area associated with the control device 200. The beacons may include the credential data. The access module 202 of the control device 200 which may scan for beacons within geofenced area of the control device 200, may detect the beacons and extract the credential data. In another example, when an access card enters the geofenced area of the control device 200, a card reader of the access module 202 may detect the card and access the credential data stored on the access card. The access module 202 may store the credential data in the access data 330. The validation module 204 may access the credential data from the access data 330 and transmit the credential data to the remote server 302 for validation wirelessly, for example, using a stable network connection. In an example, the credential data received by the access module 202 of the control device 200, by any of the example techniques explained above may be stored in the access data 330 of the control device 200 and may be transmitted to the remote server 302 for validation wirelessly.

In an example, the remote server 302 may include a repository including verification data required to validate the credential data corresponding to various user devices, such as the user device 100, received from the control device 200 or from the user device 100. The verification data may be generated when the user device 100 acquires the access rights corresponding to the restricted setup. In the example, the remote server 302, on receiving the credential data from the user device 100, may validate the credential data based on the verification data.

The communication module 104 may receive a notification indicating the validity of the credential data from the remote server 302 wirelessly. In an example, the communication module 104 may transmit the notification to the control device 200 to request access to the restricted setup. In another example, the notification may also be transmitted to the control device 200 by the remote server 302. In the example, the control device 200 may utilize the notification indicating the validity of the credential data for managing access to the restricted setup.

For example, the determination module, communication module and the location module of the user device may be understood as components of an application that may be installed on the user device. The execution of the application by the processor of the user device may carry out the functionality of the afore-mentioned modules.

On entering the geofenced area associated with the control device 200 that may be located at the restricted setup, the credential data, such as a ticket stored on the user device, such as a smart phone may be provided to the remote server 302 directly or via the control device 200 for validation. Based on automatic validation of the credential data by the remote server 302, the user may be provided access to the restricted setup, while the user device is in pocket, or a bag of the user and while the application may be running in the background mode and may not even be currently executing on the user device.

Carrying out the validation process while the application may be inactive is possible based on the storing of the credential data and geofence location on the user device. In an example, when the user device enters the geofenced area associated with the control device 200 and the user device determines that the current location of the user device falls within the geofenced area associated with the control device, the application installed on the user device may be activated to begin the process of validation. The information pertaining to the geofenced area associated with the control device 200 may be fetched from the location data 322. In another example, on entering the geofenced area associated with the control device 200, when the user device receives the beacon, for example, iBeacon transmitted by the control device 200 to advertise its presence, the reception of beacon may trigger the application installed on the user device to initiate the process of validation. Thus, the users are provided with a queue-less entry to the restricted setup.

In an example, the user device 100 may be an access card as described above and the restricted setup may be an office premise of an organization. A user of the access card may be registered as an employee of the organization. The credential data of the user may get created when the user is enrolled as an employee with the organization. The credential data may be stored on an access card and the access card may be provided to the employee. On entering a geofenced area associated with a control device 200 located at the organization, the credential data stored on the card may be provided to the remote server 302 directly or via the control device 200 for validation. Based on automatic validation of the credential data by the remote server 302, even without the employee having to remove the access card from his pocket, the employee can enter the office premises, for example, on a daily basis. In case, the organization has more than premises, for example, a main office and several branch offices, the access can be granted to each premise in a similar manner based on the credentials.

In an example, the remote server 302 may keep a count of user devices 100 present within the restricted setup. In the example, the remote server 302 may keep the count of the user devices 100 present within the restricted setup by counting a number of user devices 100 for which credential data has been validated. The remote server 302 may further update the count every time a user device 100 present within the restricted setup leaves the restricted setup. The exiting of the user device 100 may be determined based on the validation of the credential data at the exit point of the restricted setup or by determining that the user device 100 has moved outside the geofenced area of the control device 200, for example.

Based on the count of user devices 100 present within the restricted setup, the remote server 302 may determine a state of occupancy of the restricted setup. In an example, the state of occupancy may be defined as an occupancy ratio of the restricted setup which may be determined by comparison of current occupancy of the restricted setup with threshold capacity of the restricted setup. The occupancy of the restricted setup may be the count of the user devices 100 present within the restricted setup. The communication module 104 of the user device 100 may receive the state of occupancy of the restricted setup from the remote server 302. The information relating to the state of occupancy of the restricted setup may be used for a variety of purposes. For example, if the restricted setup is a bus, the state of occupancy may be used to determine if any more passengers may be onboarded onto the bus. In another example, if the restricted setup is a theater, the state of occupancy information may indicate if the occupancy is in accordance with statutory fire safety rules and notification may be issued to stakeholders in case of non-compliance.

In this manner, the remote server 302 may also manage a virtual queue to the restricted setup. The virtual queue may be indicative a sequence in which the user devices 100 may access the restricted setup, a service therein or a facility thereof. In one example, the virtual queue may be based on a sequence which the user devices 100 enter the restricted setup. In another example, the virtual queue may be based on a predefined order of priority, for instance, alike an order of priority defined for boarding an aircraft. In an example, the control device 200 may receive the credential data along with a timestamp from the user device 100. Based on the timestamps associated with the credential data obtained from multiple user devices 100 entering the restricted setup, the sequence in which user devices 100 entered the restricted setup may be determined. A virtual queue based on the sequence may be created and the users of the user devices 100 may be allowed to access the restricted setup and services therein. For example, if the restricted setup is a hospital, a virtual queue of the peoples entering the hospital may be created based on a timestamp associated with the credential data obtained from respective user devices 100. The peoples may be allowed to consult the doctor based on the virtual queue.

In an example, the virtual queue may be updated every time user devices 100 enter and exit the restricted setup. In an example, the virtual queue may be setup to indicate if the user devices 100 can be allowed to enter the restricted setup and scheduled time and sequence of entry for multiple users. For instance, based on the number of user devices 100 present within the restricted setup, any more user devices 100 that may be trying to enter the restricted setup may be allotted different time slots to ensure that there is no crowding in any specific area of the restricted setup. The communication module 104 of the user device 100 may receive information relating to the virtual queue indicating a sequence in which users of a plurality of user devices 100 are to access the restricted setup. In an example, the control device 200 may determine the state of occupancy and virtual queue in a similar manner as determined by the remote server 302. The communication module 104 of the user device 100 may receive the state of occupancy and the information relating to virtual queue from the control device 200.

Further, in another example, if the virtual queue indicates that the restricted setup has already reached its threshold capacity, the remote server 302 may not allow any more user devices 100 to enter the restricted setup until the number of user devices 100 present within the restricted setup are less than the threshold capacity. In such a situation, the remote server 302 may create a waiting list and add to the waiting list, any other user devices 100 that may try to enter the restricted setup. Further, each of the user devices 100 included in the waiting list may be allotted a schedule for entering the restricted setup. In this manner, sequence in which people are to enter the restricted setup may be managed.

It would be noted that there may be more than one control devices 200 presented at the restricted setup. The number of control devices 200 present at the restricted setup may be determined based on various factors. In an example, the number of control devices 200 present at the restricted setup may be determined based on a size of the restricted setup. For instance, when the restricted setup is a sports arena with multiple entry and exits points, the access to the sports arena may be managed by a network of multiple control devices 200 present at multiple entry and exit points of the sports arena. In such a situation, the user device 100 may determine presence of a control device 200 from amongst the network of the control devices 200 present within the predetermined range and may accordingly send the credential data to the remote server 302 for validation. Further, in such a situation, once the user device 100 determines the presence of a control device 200 within the predetermined range of the user device 100 and receives a notification of valid credential data from the remote server 302, a status of the user device 100 may be set as valid, and the user device 100 may stop determining presence of the control device 200 within the predetermined range. In an example implementation, there may be a handshake when the user device 100 detects the presence of the control device 200 within the predetermined range of the user device 100. After the handshake with one of the multiple control devices 200, the user device 100 may stop detecting the presence of another control device 200.

In another example, the number of control devices 200 present at the restricted setup may be determined based on a type of restricted setup. For instance, when the restricted setup is a secure facility where the access is to be provided in a supervised manner, the access to the secure facility may be managed by one control device 200 present at a supervised entry point of the secure facility. In such a situation, the user device 100 may transmit the credential data to the remote server 302 on determining the presence of the control device 200 present at a supervised entry point to be within the predetermined range.

In another example, the restricted setup may include one or more other restricted setups, for example, an amusement park may have one or more rides and food stalls each constituting a different restricted setup within the amusement park. Each of the other restricted setups within the restricted setup may have one or more corresponding control devices 200 to manage access to the respective setups. In such a situation, for each of the other restricted setups, interaction between the user device 100, corresponding control device 200, and the remote server 302 takes place in a similar manner as happens for the restricted setup within which the restricted setup is located. In an illustrative example, a user of the user device 100 may plan to visit an amusement park. The user may accordingly obtain tickets for the amusement park from a ticketing portal. When the user reaches at the geographical location of the amusement park, the user device 100 may begin searching for a control device 200 within the predetermined range to validate the ticket obtained from the ticketing portal. On determining the control device 200 within the predetermined range, the user device 100 may transmit the tickets to a remote server 302 for validation. Subsequently, the remote server 302 may validate the ticket and transmit a notification indicating the validity of the ticket to the user device 100. If the ticket is found to be valid, the user may be allowed access to the amusement park. It will be appreciated that in the present example where the amusement park is the restricted setup, interaction between the user device 100, the control device 200, and the remote server 302 is for exchange and validation of the ticket. In this context, the ticket may serve as the credential data.

Once the user has entered the amusement park, in an example, the user may also access one or more rides within the amusement park based on determination of the control devices 200 corresponding to the one or more rides. The user device 100 may interact with the control devices 200 corresponding to the one or more rides and the remote server 302 in a manner similar as explained above. For example, based on the determination of the control device 200 corresponding to the one or more rides within the predetermined range, access to a particular ride may be allowed or denied depending on whether the user purchased tickets/paid fare for the ride or not or whether it is the user's turn in the queue of people waiting to ride. As will be understood in light of the foregoing explanation, in the context of the present example, the ride is the restricted setup and the interaction between the control device 200, the user device 100, and the remote server 302 is for exchange and validation of the credential data, which, in the present example, is the tickets/details of the paid fare for the ride.

In an example, the user may also order food and beverages from a food stall at the amusement park. For instance, the user may purchase a food item from the user device and may receive an order number for his order. When the user reaches within a predetermined range, say 5 feet, near the food stall to collect his order, the user device may detect the presence of the control device 200 within the predetermined range. The user device 100 may accordingly transmit an order number to the remote server 302. The remote server 302 may compare the order number against the order details available at the remote server 302 and raise an alarm for delivering the food item corresponding to the user's order. Again, as will be understood, in the context of the present example, the food stall is the restricted setup and the interaction between the control device 200, the user device 100, and the remote server 302 to manage access to the food stall comprises managing of the user's order. It will be appreciated that in the present example where the food stall is the restricted setup, interaction between the user device 100, the control device 200, and the remote server 302 is for exchange and verification of the order details. In this context, the order details may serve as the credential data. Thus, examples implementations where access to a restricted setup is managed based on order details are also possible. Accordingly, credential data may comprise order details in some examples.

In another example implementation, the access module 202 of the control device 200 may determine presence of the user device 100 within a predetermined range of the control device 200. As stated above, the predetermined range of the control device 200 may be based on the geofenced area associated with the control device 200. In an example, the range configuration module 328 may configure or set the geofenced area of the control device 200 based on multiple factors, such as size of the restricted setup, size of an entry point of the restricted setup, and size of an exit point of the restricted setup. For instance, when the restricted setup is a vehicle, the range configuration module 328 may configure the geofenced area of the control device 200 to be about 3 feet. On the other hand, when the restricted setup is a restricted premises, such as an office, hospital, mall, and theatre, the range configuration module 328 may configure the geofenced area of the control device 200 based on a size of an entry point of the restricted setup. In an example, for a restricted premises, the geofenced area may be about 20 feet.

Further, embodiments wherein the geofenced area of the control device 200 is configured independently for the entry point of the restricted setup and size of an exit point of the restricted setup are also possible. In an example, the range configuration module 328 may configure the geofenced area of the control device 200 to be more than 1 inch and less than 5 feet for the entry point of the restricted setup and more than 5 feet and less than 100 feet for the exit point of the restricted setup.

In an example, the range configuration module 328 may configure the predetermined range within which the user device 100 is to be detected by the control device 200. In an example, the range configuration module 328 may determine an operating power of the control device 200 and configure or set the predetermined range which, as would be understood, corresponds to the geofenced area of the control device 200 based on the operating power. The range configuration module 328 may alter the operating power being supplied to a wireless communication module, such as a Bluetooth module of the control device 200. In an example, to facilitate configuration of the Bluetooth module, the control device 200 may include a range map including different Received Signal Strength Indicators (RSSI) mapped to different operating powers. The range map may be predetermined and stored in the range data. The operating power may include transmission power of the control device 200. To configure the predetermined range of the Bluetooth module for the control device, the range configuration module 328 may select one of the RSSI and corresponding operating power.

The access module 202 may determine presence of the user device 100 within the predetermined range based on various communication, such as Wi-fi, Bluetooth, Near Field Communication, and Radio protocols frequency identification. In an example, to determine presence of the user device 100 within the predetermined range, the access module 202 may scan, for example, periodically, within the predetermined range for a beacon transmitted by the user device 100. On determining the user device 100 to be within the predetermine range, the access module 202 may receive the credential data from the user device 100. As already described, the credential data may be indicative of access rights corresponding to the restricted setup. In an example, the access module 202 may store the credential data in access data 330.

In an example, the user device 100 may transmit the credential data to the control device 200 based on the BLE protocol. The BLE protocol involves exchange of information in short data bursts. To exchange credential data via the BLE protocol, the user device 100 may periodically turn on a radio, transfer or receive the credential data, and turn off the radio. In the example, the user device 100 may turn on the radio on entering the geo-fenced area associated with the control device 200, transmit the credential data to the control device 200, and turn off the radio once the credential data has been transmitted. In another example, the user may transmit the beacon including the credential data on entering the geo-fenced area associated with the control device 200. The beacon may also be transmitted using a BLE protocol. The access module 202 may detect the presence of the user device 100 on reception of a beacon within the geofenced area of the control device 200. The access module 202 may extract credential data from the received beacon. In another example, the user device 100 may transmit the credential data to the control device 200 via a stable network connection or via a IoT based protocol such as MQTT.

In the aforementioned example, the user device 100 may begin transmitting the credential data only when a predetermined condition is met. For instance, in an illustrative example, when the restricted setup is stationary, e.g., a movie theatre, the user device 100 may begin transmission of the credential data on entering a geo-fenced area associated with the control device 200 present at the movie theatre. In another illustrative example, when the restricted setup is non-stationary, e.g., a vehicle, the user device 100 may begin transmission of the credential data on reception of a user input.

In an example, when the user device is an access card such as Bluetooth based smart card or Near Field Communication (NFC) based access cards, the access module may include a card reader that may allow to manage access to the restricted setup based on the access card. In operation, the access rights corresponding to the restricted setup may be stored on a Bluetooth smart card. The Bluetooth based smart card may then be utilized for facilitating validation of access rights corresponding to a restricted setup. Subsequently, the access module 202 may detect the presence of the access card within the predetermined range of the control device 200. In an example, to detect the presence of the access card within the predetermined range of the control device 200, the access module 202 may transmit NFC signals at regular intervals. The NFC based access cards, on reception of the NFC signal, may transmit credential data indicative of access rights to the control device 200. Thereafter, the access module 202 may receive the credential data and store the same in the access data 330.

In another example, where the user device 100 is an access card, for example, a smart card including a beacon transmitter, the access module 202 may, without an assistance of the card reader, receive the credential data from the access card. For instance, the access module 202 may scan for the beacons transmitted by the user device 100 and on reception of the beacon, may extract the credential data therefrom. The credential data may be stored in the access data 330.

Once the credential data has been received, the validation module 204 may access the access data 330 to fetch the credential data. The validation module 204 may then transmit the credential data to the remote server 302 for validation.

In an example, the remote server 302 may include a repository including verification data required to validate the credential data received from various control devices, such as the control device 200. The verification data may be generated when the user device 100 acquires the access rights corresponding to the restricted setup. In the example, the remote server 302, on receiving the credential data from the control device 200, may validate the credential data based on the verification data. In the example, the remote server 302 may subsequently transmit a notification indicating the validity of the credential data to the control device 200. In an example, if network connectivity between the remote server 302 and the control device 200 is available, the remote server 302 may transmit the notification. Further, if network connectivity is not found or is found to be unreliable, the remote server 302 may send the notification to the user device 100 directly and may also wait for the network connectivity to be restored. Once the network connection is restored, the notification may be transmitted by the remote server 302 by the control device 200.

The validation module 204 may subsequently receive a notification indicating the validity of the credential data from the remote server 302 wirelessly. In an example, the notification may also be transmitted to the user device 100 by the remote server 302. The control device 200 may utilize the notification indicating the validity of the credential data for managing access to the restricted setup. The validation module 204 may also send the notification indicating permission to enter the restricted setup based on the validity of the credential data to the user device 100.

In an example, the access module 202 may keep a count of user devices 100 present within the restricted setup. In the example, the access module 202 may keep the count of the user devices 100 present within the restricted setup by counting a number of user devices 100 for which credential data has been validated. The access module 202 may further update the count every time a user device 100 present within the restricted setup leaves the restricted setup. The exiting of the user device 100 may be determined based on the validation of the credential data at the exit point of the restricted setup or by determining that the user device 100 has moved outside the predetermined range of the control device 200, for example. Based on the count of user devices 100 present within the restricted setup, the access module 202 may determine a state of occupancy of the restricted setup in a similar manner as determined by the remote server. The occupancy of the restricted setup may be the count of the user devices 100 present within the restricted setup which in turn is based on a count of the user devices 100 entering the restricted setup and exiting the restricted setup. The validation module 204 may manage access to the restricted setup based on the state of occupancy. In an example, the access module 202 may determine an estimated time of entry to the user device 100 based on the state of occupancy of the restricted setup. The validation module 204 may send a notification indicating the estimated time of entry to the user device 100 wirelessly. The communication module 104 of the user device 100 may receive the state of occupancy of the restricted setup from the control device 200. In this manner, the access module 202 of the control device 200 may also maintain a virtual queue pertaining to the restricted setup based on the count which is updated every time user devices 100 enter and exit the restricted setup. In an example, the virtual queue may be setup to indicate if the user devices 100 can be allowed to enter the restricted setup and scheduled time and sequence of entry for multiple user devices. The validation module 204 may manage access to the restricted setup based on the virtual queue. The communication module 104 of the user device 100 may receive information relating to the virtual queue indicating a sequence in which users of a plurality of user devices 100 are to access the restricted setup. For instance, based on the number of user devices 100 present within the restricted setup, any more user devices 100 that may be trying to enter the restricted setup may be allotted different time slots to ensure that there is no crowding in any specific area of the restricted setup.

Further, in another example, if the virtual queue indicates that the restricted setup has already reached its threshold capacity, the access module 202 may not transmit the credential data corresponding to such devices to the remote server 302 for validation, thereby preventing any more user devices 100 to enter the restricted setup until the number of user devices 100 present within the restricted setup are less than the threshold capacity. In such a situation, the access module 202 may create a waiting list and add to the waiting list, any other user devices 100 that may try to enter the restricted setup. Further, each of the user devices 100 included in the waiting list may be allotted a schedule for entering the restricted setup. In this manner, order in which people are to enter the restricted setup may be managed.

In an illustrative example, a user of the user device 100 may plan to visit an amusement park. The user may accordingly obtain tickets for the amusement park from a ticketing portal. When the user reaches at the geographical location of the amusement park, the user device 100 may begin transmitting the credential data corresponding to the ticket. When the user device 100 reaches within a predetermined range of the control device 200, the control device 200 may receive the credential data corresponding to the tickets. On receiving the credential data, the control device 200 may transmit the same to a remote server 302 for validation. Subsequently, the remote server 302 may validate the credential data and transmit a notification indicating the validity of the ticket to the control device 200. If the ticket is found to be valid, the user may be allowed access to the amusement park. It will be appreciated that in the present example where the amusement park is the restricted setup, interaction between the user device 100, the control device 200, and the remote server 302 is for exchange and validation of the ticket.

Once the user has entered the amusement park, in an example, the user may also wish to access one or more rides within the amusement park. The control devices 200 corresponding to the one or more rides may interact with the user device 100 and the remote server 302 in a manner similar as explained above. For example, based on the determination that the user device 100 is within the predetermined range, access to a particular ride may be allowed or denied depending on whether the user purchased tickets/paid fare for the ride or not. As will be understood in light of the foregoing explanation, in the context of the present example, the ride is the restricted setup and the interaction between the control device 200, the user device 100, and the remote server 302 is for exchange and validation of the credential data, which, in the present example, is the tickets/details of the paid fare for the ride.

In an example, the user may also order food and beverages from a food stall at the amusement park. For instance, the user may purchase a food item from the user device 100 and may receive an order number for his order. When the user reaches within a predetermined range, say 5 feet, near the food stall to collect his order, the control device 200 may detect the presence of the user device 100 within the predetermined range. The control device 200 may accordingly receive an order number from the user device 100 and transmit the same to the remote server 302. The remote server 302 may compare the order number against the order details available at the remote server 302 and raise an alarm for delivering the food item corresponding to the user's order. Again, as will be understood, in the context of the present example, the food stall is the restricted setup and the interaction between the control device 200, the user device 100, and the remote server 302 to manage access to the food stall comprises managing of the user's order. It will be appreciated that in the present example where the food stall is the restricted setup, interaction between the user device 100, the control device 200, and the remote server 302 is for exchange and verification of the order details. In this context, the order details may serve as the credential data. Thus, examples implementations where access to a restricted setup is managed based on order details are also possible. Accordingly, credential data may comprise order details in some examples.

Accordingly, the techniques described herein enable the users to scan the tickets available on the user device in their pockets at rapid speeds, e.g., of less than 1 second per user. In an example, the tickets may be scanned at a speed of 500 ms per user. This provides a seamless walk-in experience for users where they need not wait for their devices to be scanned. The scanning happens as quickly as they walk by providing a queue-less entry experience in venues. Validation process may be adjusted without manual intervention, optimizing entry processes for different scenarios.

Figure 4:
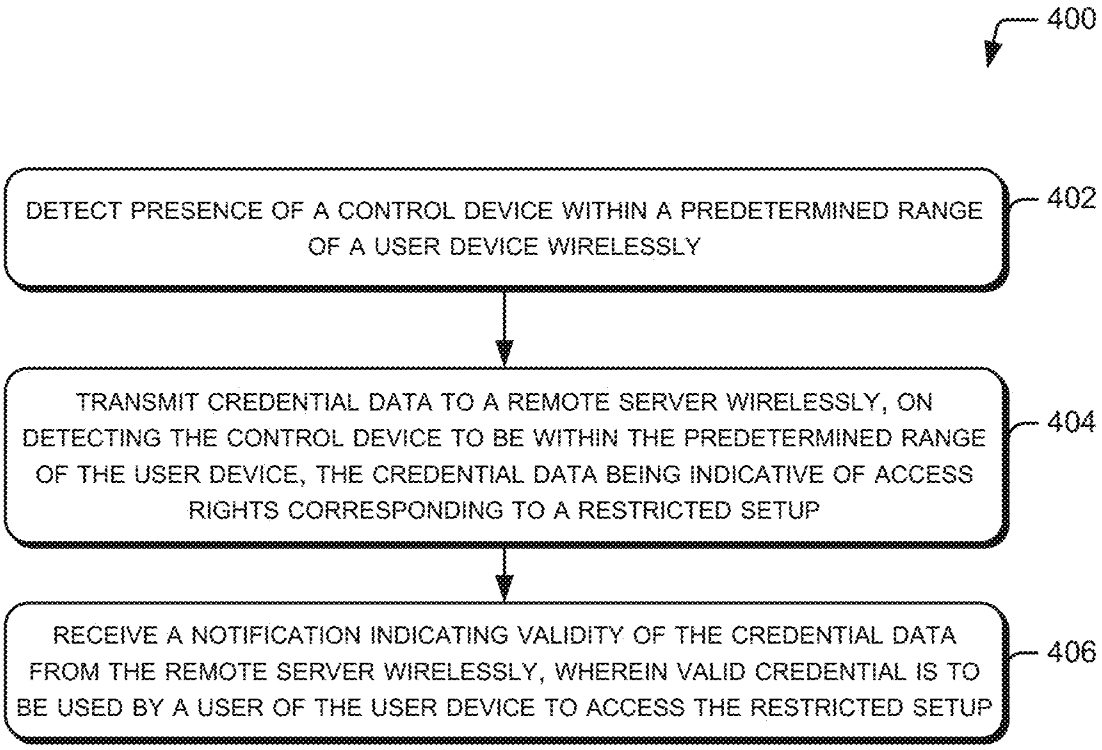
FIG. 4 illustrates a method for facilitating validation of access rights corresponding to the restricted setup, in accordance with an example of the present subject matter.

FIG. 4 illustrates a method 400 for facilitating validation of access rights corresponding to a restricted setup, in accordance with examples of the present subject matter. The order in which the method is described is not intended to be construed as a limitation, and any number of the described method blocks may be combined in any order to implement the methods, or an alternative method. Further, the method 400 may be implemented by processing resource or computing device(s) through any suitable hardware, non-transitory machine-readable instructions, or combination thereof.

It may also be understood that method 400 may be performed by programmed computing device, such as the user device 100, as depicted in FIG. 1 and FIG. 3. Furthermore, the method 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The method 400 is described below with reference to the user device 100, as described above; other suitable systems for the execution of these methods may also be utilized. Additionally, implementation of the method is not limited to such examples.

The method 400 starts at block 402. At block 402, presence of a control device 200 within a predetermined range of a user device 100 may be detected wirelessly. The control device 200 may be present at the restricted setup. Further, the presence of the control device 200 may be determined based on various communication protocols, such as Wi-fi, Bluetooth, BLE, Near Field Communication, and Radio frequency identification. In an example, the presence of the control device 200 within the predetermined range of the user device may be determined by a communication module 104 of the user device 100.

At block 404, on detecting the control device 200 to be within the predetermined range of the user device 100, credential data indicative of the access rights corresponding to the restricted setup may be transmitted to a remote server 302, such as the remote server 302, wirelessly. The credential data may be transmitted to the remote server 302 for validation of the access rights corresponding to the restricted setup. In an example, the credential data may be transmitted to the remote server 302 by a communication module 104 of the user device 100.

At block 406, a notification indicating the validity of the credential data may be received from the remote server 302 wirelessly. The notification indicating the validity of the credential data may then be utilized for managing access to the restricted setup. In an example, the notification indicating the validity of the credential data may be received by the communication module 104.

Sending the credential data to the remote server 302 for validation on determining the control device 200 to be within the predetermined range of the user device 100 ensures validation of the credential data without establishment of a connection between the user device 100 and the control device 200. Accordingly, the efficiency involved in validation of credential data at the restricted setup is improved.

Figure 5:
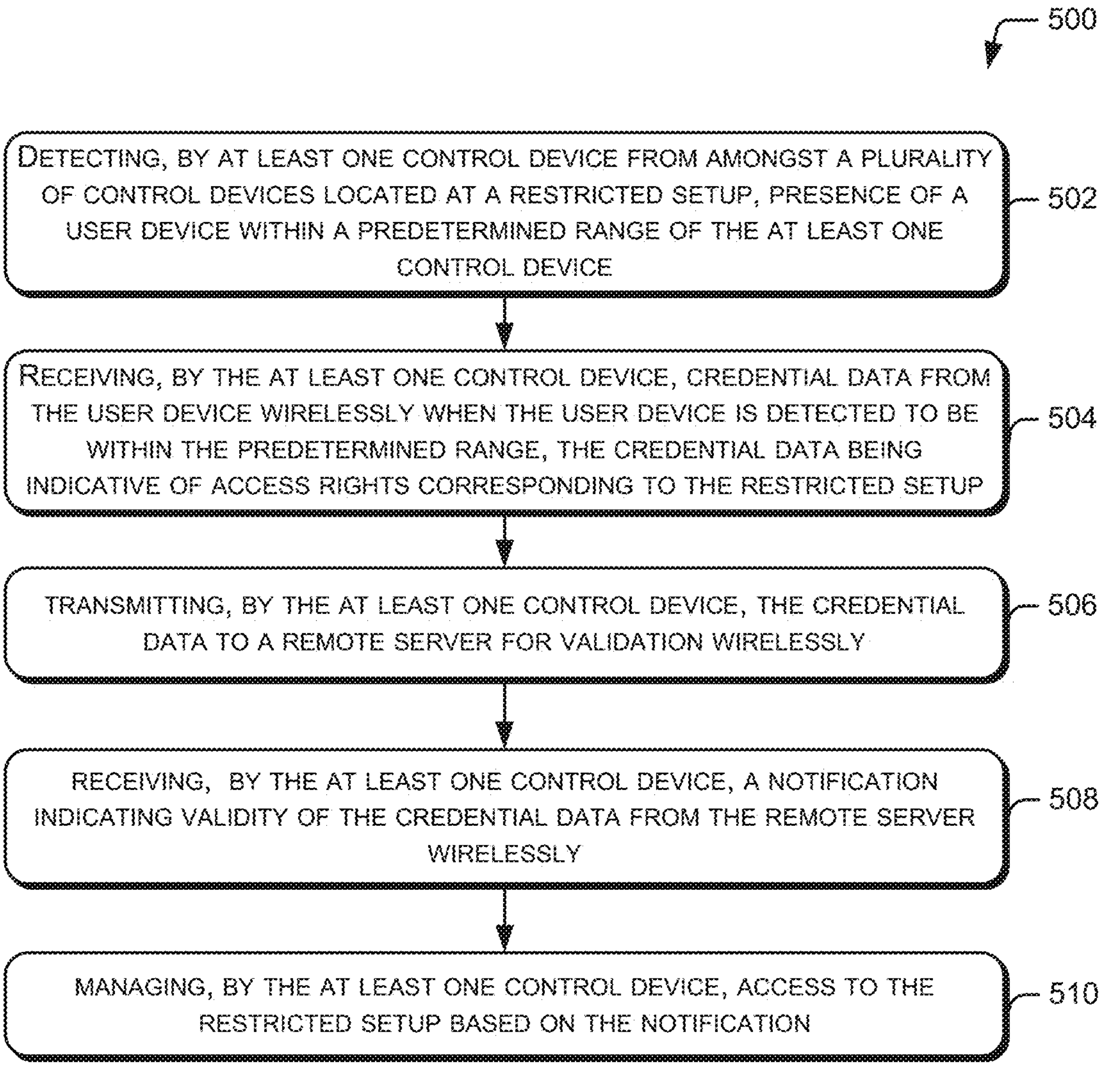
FIG. 5 illustrates another method for facilitating validation of access rights corresponding to the restricted setup, in accordance with an example of the present subject matter.

FIG. 5 illustrates a method 500 for facilitating validation of access rights corresponding to a restricted setup, in accordance with another example of the present subject matter. The order in which the method is described is not intended to be construed as a limitation, and any number of the described method blocks may be combined in any order to implement the methods, or an alternative method. Further, the method 500 may be implemented by processing resource or computing device(s) through any suitable hardware, non-transitory machine-readable instructions, or combination thereof.

It may also be understood that method 500 may be performed by programmed computing device, such as the control device 200, as depicted in FIG. 2 and FIG. 3. Furthermore, the method 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The method 500 is described below with reference to the control device 200, as described above; other suitable systems for the execution of these methods may also be utilized. Additionally, implementation of the method is not limited to such examples.

At block 502, at least one control device 200 from amongst a plurality of control device located at a restricted setup, detects presence of a user device 100 within a predetermined range of the at least one control device 200. The predetermined range of the control device 200 may correspond to a geofenced area associated with the control device 200. The presence of the user device 100 within the predetermined range may be determined based on various communication protocols, such as Wi-fi, Bluetooth, Near Field Communication, and Radio frequency identification.

At block 504, credential data is received by the at least one control device 200 from the user device 100 wirelessly, when the user device 100 is detected to be within the predetermined range. The credential data may be indicative of access rights corresponding to the restricted setup. Further, the credential data may be received from the user device 100 based on BLE protocol. In an example, the credential data may be received by an access module 202 of the at least one control device 200.

At block 506, the credential data may be transmitted by the at least one control device 200 to a remote server 302 wirelessly. The credential data may be transmitted to the remote server 302 for validation. In an example, the credential data may be transmitted to the remote server 302 by a validation module 204 of the at least one control device 200.

At block 508, a notification indicating validity of the credential data may be received wirelessly by the at least one control device 200 from the remote server 302. In an example, the notification indicating the validity of the credential data may be received by the validation module 204. Further, at block 510, based on the notification, access to the restricted setup may be managed. For example, if the notification indicates that the credential data of the user device 100 is valid, the user device 100 may be allowed access to the restricted setup. In an example, a state of occupancy of the restricted setup may be determined by the at least one control device 200, based on a count of a number of user devices 100 entering the restricted setup and exiting the restricted setup. Access to the restricted setup may be managed by the at least one control device 200 based on the state of occupancy.

Receiving the credential data at the control device 200 for validation based on the BLE protocol ensures validation of the credential data without establishment of a persistent connection between the user device 100 and the control device 200. Accordingly, the efficiency involved in validation of credential data at the restricted setup is improved.

Although examples of the present subject matter have been described in language specific to methods and/or structural features, it is to be understood that the present subject matter is not limited to the specific methods or features described. Rather, the methods and specific features are disclosed and explained as examples of the present subject matter.

The invention claimed is:

1. A user device comprising:

a processor to:

determine a location of the user device; and determine whether the user device is within a geofenced area associated with a control device, based on the location of the user device;

upon determining the user device to be within a geofenced area associated with the control device, detect presence of the control device within a predetermined range of the user device by scanning for a beacon transmitted by the control device;

on detecting the control device to be within the predetermined range, transmit credential data to a remote server for validation either directly or via the control device without establishing a persistent connection between the user device and the control device, the credential data being indicative of access rights corresponding to a restricted setup; and receive a notification indicating validity of the credential data from the remote server wirelessly, wherein the remote server validates the credential data based on a corresponding verification data stored at the remote server, and wherein valid credential is to be used by a user of the user device to access the restricted setup.

2. The user device as claimed in claim 1, wherein the processor is to further transmit the notification indicating validity of the credential data to the control device wirelessly to request access to the restricted setup.

3. The user device as claimed in claim 1, wherein the processor is to further receive information relating to state of occupancy of the restricted setup wirelessly from at least one of the remote server and the control device, the state of occupancy being based on a count of user devices entering the restricted setup and exiting the restricted setup.

4. The user device as claimed in claim 1, wherein the processor is to further receive information relating to a virtual queue indicating a sequence in which users of a plurality of user devices are to access the restricted setup.

5. The user device as claimed in claim 1, wherein to transmit the credential data to the remote server via the control device, the user device transmits one or more beacon comprising the credential data, based on detection of presence of the control device within the predetermined range of the user device.

6. The user device as claimed in claim 1, wherein the predetermined range of the user device is based on at least one of size of the restricted setup, area of the restricted setup, size of entry point of the restricted setup and size of exit point of the restricted setup.

7. The user device as claimed in claim 1, wherein the user device is an access card.

8. A control device comprising:

a processor to:

transmit one or more beacons at regular intervals to advertise presence of the control device to one or more user devices present within a geofenced area associated with the control device;

on detecting by a user device, presence of the control device within a predetermined range of the user device based on reception of the one or more beacons, receive credential data from the user device without establishment of a persistent connection between the user device and the control device, the credential data being indicative of access rights corresponding to a restricted setup;

transmit the credential data received from the user device to a remote server wirelessly for validation;

receive a notification indicating validity of the credential data from the remote server wirelessly, wherein the remote server validates the credential data based on a corresponding verification data stored at the remote server; and manage access to the restricted setup based on the notification.

9. The control device as claimed in claim 8, wherein the processor is to send a notification indicating permission to enter the restricted setup based on the validity of the credential data, wirelessly to the user device.

10. The control device as claimed in claim 8, wherein the control device is located at the restricted setup and the geofenced area associated with the control device is based on a geolocation of the restricted setup.

11. The control device as claimed in claim 8, wherein the processor is to set the geofenced area of the control device based on at least one of size of the restricted setup, area of the restricted setup, size of entry point of the restricted setup and size of exit point of the restricted setup.

12. The control device as claimed in claim 8, wherein the processor is to:

determine state of occupancy of the restricted setup based on a count of user devices entering the restricted setup and exiting the restricted setup; and manage access to the restricted setup based on the state of occupancy.

13. The control device as claimed in claim 12, wherein the processor is to send a notification indicating an estimated time of entry to the user device wirelessly based on the state of occupancy of the restricted setup.

14. The control device as claimed in claim 12, wherein the processor is to maintain a virtual queue pertaining to the restricted setup based on the count, the virtual queue indicating a sequence of entry of the user devices; and manage access to the restricted setup based on the virtual queue.

15. The control device as claimed in claim 14, wherein the processor is to determine an operating power of the control device and to set geofenced area of the control device based on the operating power.

16. A method comprising:

transmitting, by a plurality of control devices located at a restricted setup, one or more beacons at regular intervals to advertise presence of the respective control devices to one or more user devices present within a geofenced area associated with the plurality of control devices;

on detecting by a user device, presence of a control device from amongst the plurality of control devices within a predetermined range of the user device based on reception of the one or more beacons, receiving, by the control device, credential data from the user device without establishing a persistent connection between the user device and the control device, the credential data being indicative of access rights corresponding to the restricted setup;

transmitting, by the control device, the credential data to a remote server for validation wirelessly;

receiving, by the control device, a notification indicating validity of the credential data from the remote server wirelessly, wherein the remote server validates the credential data based on a corresponding verification data stored at the remote server; and managing, by the control device, access to the restricted setup based on the notification.

17. The method as claimed in claim 16 further comprises:

determining, by the control device, state of occupancy of the restricted setup based on a count of a number of user devices entering the restricted setup and exiting the restricted setup; and managing, by the control device, access to the restricted setup based on the state of occupancy.

* * * * *